March 3, 1942. H. E. SOMES 2,275,021
PROCESS OF MAKING TOOLS
Filed July 1, 1938 2 Sheets-Sheet 1

INVENTOR.
Howard E. Somes
BY
ATTORNEY.

March 3, 1942.   H. E. SOMES   2,275,021
PROCESS OF MAKING TOOLS
Filed July 1, 1938   2 Sheets-Sheet 2
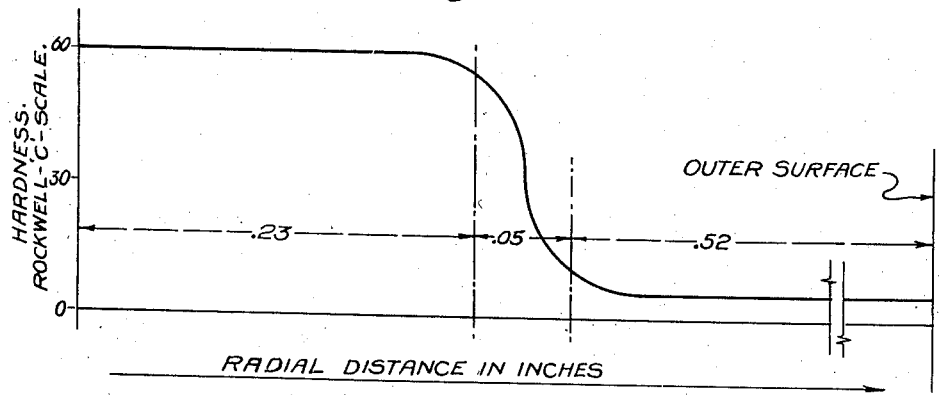
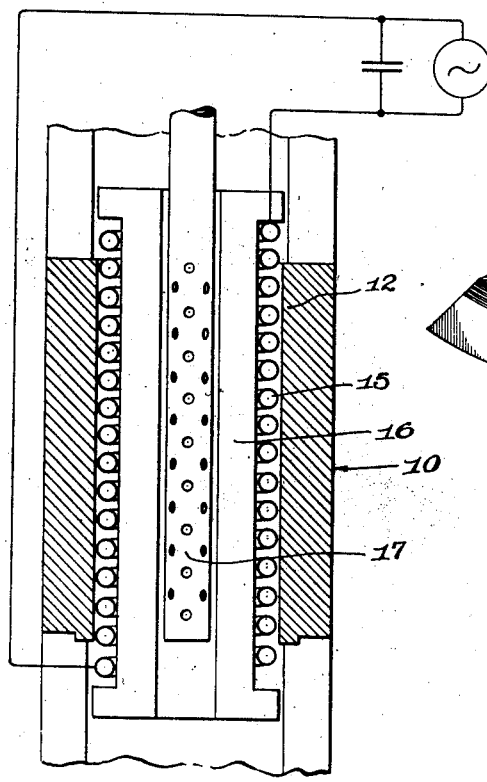
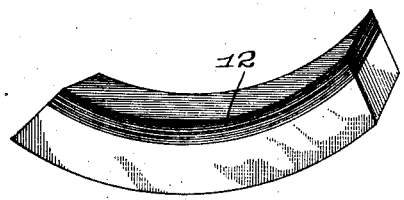
INVENTOR:
HOWARD E. SOMES
BY
ATTORNEY Patented Mar. 3, 1942

2,275,021

UNITED STATES PATENT OFFICE 2,275,021

PROCESS OF MAKING TOOLS

Howard E. Somes, Grosse Pointe Park, Mich., assignor to Budd Induction Heating, Inc., Philadelphia, Pa., a corporation of Michigan Application July 1, 1938, Serial No. 216,930

2 Claims. (Cl. 76—101)

This invention has to do outstandingly with a machine cutting tool of the bar type such as is commonly used on turning lathes, shapers, and planers. The process of producing this tool, however, is, I believe, a very adaptable one, possessing such a degree of adaptability that it is not unlikely that it can be applied to production of machine cutting tools of other than the bar type and yet containing the outstanding characteristics which differentiate the tool of the bar type, produced by the use of this method, from other tools of the bar type. Not withstanding this adaptability, however, the tool and the method of producing it, possess characteristics inextricably intertwined, and in the light of this identity of characteristics, constitute really one and the same invention.

Broadly speaking, my method of producing these tools of the bar type consists in surface hardening the metal stock of which the tools are to be made, and, thereafter, cutting up said stock and the portions adapted to be formed each into an individual tool, each portion containing a portion of the hardened surface adapted to be constituted the cutting edge of the tool. Preferably the stock is initially given the shape of a cylinder, and the hardened surface is a surface of the cylinder. By making the cylinder hollow and hardening the interior surface, and, thereafter, severing into portions by cutting into bars along radial planes, bars of substantially rectangular form and of any requisite cross section may be immediately obtained. The length of the cylinder, of course, determines the length of the bar. The axial length of the hardened interior surface determines the length of the tool available for cutting.

Also, according to my method, I harden to a considerable depth, a depth which gives the hardened portion the nature of a zone, as compared with the total thickness of the stock, but this zone is of a depth which is a minor fraction only of the total thickness of the stock. This hardened zone I produce by a process of high speed short time hardening, by high frequency electro-magnetic induction of heating currents in such manner that the hardness of the zone is not only great, but uniform for its full depth, where it terminates abruptly in its one-piece junction with the unhardened body of the stock, which remains in its normalized condition. This makes it easy to cut this stock with bar type tools or milling machine cutters down to the hardened zone, and, thereafter, to use a grinding wheel to cut through the hardened zone, and these steps, like the foregoing, also constitute steps of my method.

The machine tool of my invention thus consists of a main body of elongated form having one longitudinal surface hardened to an appreciable depth, and the remaining portion of its main body unhardened. This longitudinally extending hardened surface not only adjoins the cutting edge in the tools, but extends longitudinally along the main body a great distance, or even all the way, whereby a great portion of the longitudinal extent of the tool may be formed into cutting edges as one after another is worn out. Thus the tool embodies a hardened cutting zone which terminates abruptly in its one-piece joinder with the unhardened portion of the tool as distinguished from the otherwise usually found gradual merger of the hardened and unhardened portion, but gradually lessening hardness. This abrupt termination constitutes indeed a well-defined zone of demarcation.

In the accompanying drawings I show one embodiment of the method of my invention, by several different forms of machine tools.

In the drawings,

Figure 7 is a curve of hardness through the treated portion.

Figure 8 is a diagrammatic illustration of one form of apparatus for applying energy for hardening by high frequency electro-magnetic induction.

Figure 9 is a tool formed from a ring section of the hardened stock.

Figure 3:
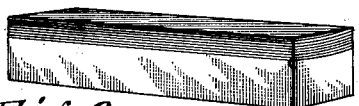
Figure 3 is a three-fourths front perspective of a longitudinal portion cut from the cylinder of Figures 1 and 2, after hardening, and ready for formation of its cutting portion.
Figure 5:
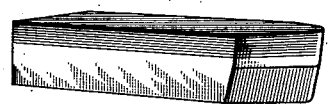
Figures 4 to 6 are three-fourths front perspectives of tools formed from portions of hardened stock such as those of Figure 3.
Figure 4:
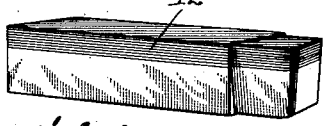
Figure 6:
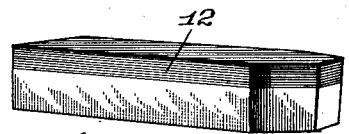
Figure 2:
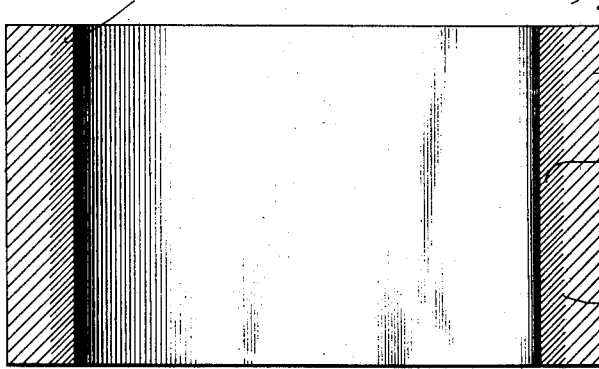
Figure 2 is an axial section of this cylinder on line 2—2 of Figure 1.
Figure 1:
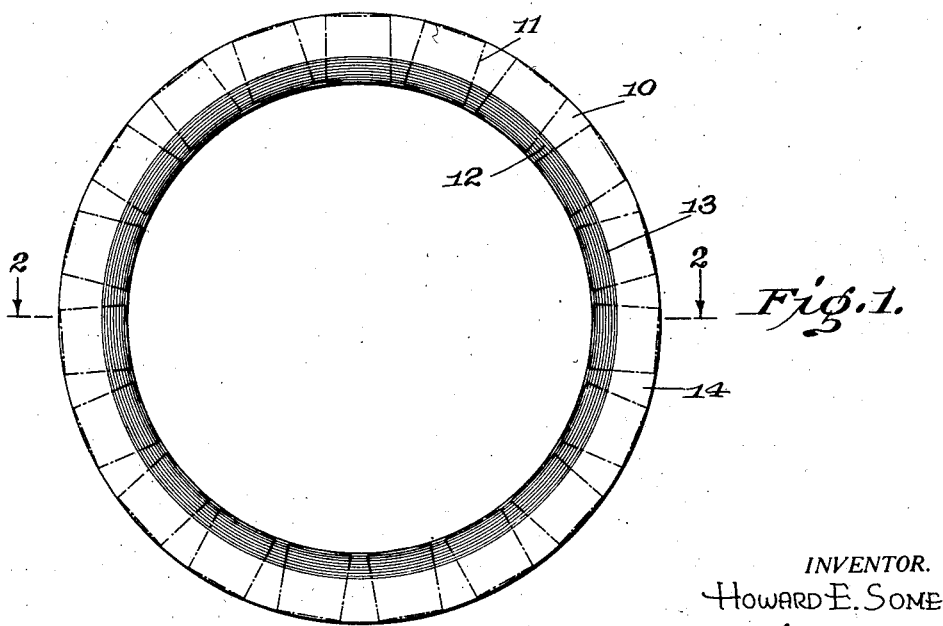
Figure 1 is an end elevation of a hollow cylinder of stock from which tools are to be formed.

Referring now to the drawings—Figures 1 and 2 disclose stock from which the tool is to be formed in the form of a hollow cylinder 10 of a wall thickness, equal to the thickness of the tools desired, from cutting edge to the opposite side. The diameter of this hollow cylinder depends upon the width of the tools desired and the number required to be formed from a single piece of stock 10. In the illustration of Figures 1 and 2 I have shown, by dash and dot lines 11, stock sufficient to form nineteen bar type tools of the form shown in Figures 4 to 6. The length of the cylinder 10 determines the maximum length of the tool. However, it should be apparent that great lengths of cylinders may be used and lengths sufficient to form bars of great length which, in turn, can be each cross cut to form each a number of tools. Also, the treated cylinder may be cut into rings the width of the desired tool and the rings cut into arc shaped sections to form tools, as shown in Figure 9. The composition of the stock may indeed be any known hardenable tool-forming steel or other material.

Thus, the first step of my method consists in the formation of the hollow cylinder of proper dimensions.

According to the second step of my invention, the inner surface of this hollow cylinder 10 is a surface or zone hardened to a considerable depth as illustrated by the shaded zone 12. This is done by an application of high frequency energy by electro-magnetic induction for such a short period of time, and at such an extremely high rate of introduction of energy, and such a high rate of quenching that throughout the depth of the zone 12, the hardness is substantially uniform, and the plane of demarcation 13 between the hardened zone and the unhardened main body 14 of the stock is abrupt and sharp. This condition is illustrated in Figure 7 which represents a curve of hardness by the Rockwell scale, as applied to the wall of the cylinder 10 after hardening. Reference characters used are the same as those on the other figures of the drawings.

The apparatus for carrying out this second step of my invention is illustrated diagrammatically in Figure 8, which consists of a work coil 15 juxtaposed to the zone 12 which is to be hardened and which coil is arranged to be connected and disconnected from a source of high frequency energy of adequate power to supply the energy at the high rate required, a magnetic core 16 for the work coil, the coil and the core being projectable at will axially into and out of the cylinder 10, and the quenching nozzle 17 adapted to supply quenching fluid at a high rate from a suitable source, and, likewise, projectable independently of the coil and core, axially into and out of juxtaposed relation to the zone 12. In hollow cylinders having walls approximately one-half inch thick, and having hardened zones 12 approximately one-tenth inch thick hardened by subjection to energy from a 2500 cycle source at the rate of the order of 3000 kw. for one and eight-tenth seconds, produces the uniform hardness and abrupt plane of demarcation of hardness depicted in Figure 7. In this specific instance the cylinder wall was approximately one-half inch thick, but this thickness is probably not critical. Variations in zone depth can be had by adjusting the time of application, the rate of application, and the frequency. Preferably, I maintain the frequency relatively very high and, likewise, maintain high the rate of application of energy. Thereby the main body of the stock 10, which is not to be hardened, is retained so cool as to assist the quenching nozzle in the abrupt termination of the zone of increased hardness.

Other factors assuring uniformity of the hardened zone and abrupt termination thereof are the application of quench immediately following the expiration of the time of application of energy, and the production of a state of autofrettage in the hardened zone 12 incident to the combination of this immediate external quench and the accompanying internal quench, incident to the relatively cold condition of the main body of the material. This state of autofrettage is produced according to my best belief by an enlarged grain growth which occurs upon the abrupt drop of temperature at the quench, the large grain growth placing zone 12 in a state of compression, in which it is held by the surrounding unhardened zone, which on its part, is placed in a state of tension bodily by the enlarged grain growth and the shrinkage which follows the final cooling of the stock. Thus, there are produced in the hardened zone 12 an extreme denseness and pervading homogeneity. The abruptness of demarcation of the zone of hardness is additionally furthered during the time of heating by that compression within the zone 12 occasioned by its expansion during the rise of its temperature. This tendency to expansion progressing from the inner surface radially outwardly the depth of the zone 12 progressively increases the compression stress under which the material is heated, and this progressively lowers the decalescent point with a result that all depths of the zone 12 reach decalescence substantially at the same instant. They are thereupon quenched at the said same instant.

What I claim is:

1. The method of making a number of cutting tools each having an edge of hardened material and an unhardened, tough, support for the hardened edge extending substantially adjacent and behind the cutting edge, which comprises hardening a cylinder by heating the radially inner surface thereof so rapidly that said surface is hot enough for hardening well before the entire radial depth of the cylinder has been heated, quenching the heated portion to harden it rapidly to leave a sharp line of demarcation between the hardened and unhardened portions, and separating the cylinder into a number of tool blanks by cutting into the cylinder transversely of the hardened and unhardened portions to retain the tough unhardened portion adjacent the cutting edge as the backing support therefor.

2. The method of making substantially more than two cutting tools each having an edge of hardened material extending longitudinally of the tool for more than the cutting edge portion and an unhardened support for the cutting edge extending substantially the full length of a face opposite the hardened cutting edge portion, which comprises hardening an inner surface of a cylinder by heating said surface so rapidly that it is hot enough for quenching and hardening well before a major portion of the radial depth of the cylinder wall has been heated, quenching the heated portion to harden it rapidly and leave a sharp line of demarcation between the hardened and unhardened portions whereby the heated portion will be made more dense and stressed in compression by tension in the unhardened portion after quenching said heated portion, and forming the tool blanks by cutting the cylinder longitudinally of its axis with a slicing cut substantially transversely of the hardened and unhardened portions whereby the integrally connected tool blanks are separated into tool blanks of substantially the desired width.

HOWARD E. SOMES.